3,445,783
Patented May 20, 1969

3,445,783

CIRCUIT ARRANGEMENT FOR THE ELECTRONIC SIMULATION OF A TELEGRAPH RELAY

Heinz Roos, Stuttgart-Zuffenhausen, and Hans Semle, Korntal, Germany, assignors to International Standard Electric Corporation, New York, N.Y., a corporation of Delaware Filed Aug. 17, 1965, Ser. No. 480,314
Claims priority, application Germany, Aug. 22, 1964, St 22,574
Int. Cl. H03b *19/12;* H03k *3/30*
U.S. Cl. 331—51 7 Claims

ABSTRACT OF THE DISCLOSURE

Electronic means are provided for simulating the characteristics of a telegraph relay. The means include a first oscillator controlled by input pulses which in turn controls a second oscillator which in turn provide control for a contact arrangement.

The present invention relates to a circuit arrangement for the electronic simulation of a telegraph relay for single- or double-current operation.

Various types of electronic simulators are known for telegraph relays. One conventional arrangement comprises a self-oscillating oscillator whose damping is either reduced or increased respectively, by the input signals. On a winding accommodated on the same core as the windings of the oscillator, a signal will then appear when the oscillator vibrates. This signal is rectified and is further processed as an amplified input signal (German printed application (DAS) 1,103,966). In another conventional type of relay simulation the input signals are applied to a transistor via which the power supply for a subsequently arranged oscillator is switched on or off. Also in this case the output signals are capable of being tapped at a further winding of the oscillator transformer (German printed application (DAS) 1,168,951).

In the arrangement to be described hereinafter there is proposed an entirely new way of simulating an electronic relay. The arrangement differs from the conventional arrangements by a different circuit construction, and by improved electrical properties. In the conventional arrangements the oscillators first slowly start to vibrate upon arrival of an input pulse, due to the flattened leading edge of the input pulse, and there does not result a defined time position for the output signal, or this output signal likewise has no steep leading edge respectively. The novel arrangement is featured by high amplification, by very good trigger properties, and the distortions of the incoming telegraph signals can be reduced with the aid of balancing means.

The invention relates to a circuit arrangement for the electronic simulation of a telegraph relay suitable for single- or double-current operation. It is characterized by the fact that there are assembled the following electronic component groups:

(a) A first block oscillator controlled by the input pulses and operated by their energy, (b) A second blocking oscillator controlled by the first oscillator and galvanically separated therefrom, (c) A contact arrangement controlled by the second blocking oscillator, and galvanically separated therefrom.

In a first type of embodiment of the invention the coils of the two oscillators are arranged on separate cores, in order to prevent the two oscillators from magnetically influencing each other. In a particularly favourable second type of embodiment of the invention the coils of the two oscillators are wound on a common core, so that there results a certain dependence of the two oscillators upon one another. Most advantageously the oscillators are designed as blocking oscillators.

Figure 1:
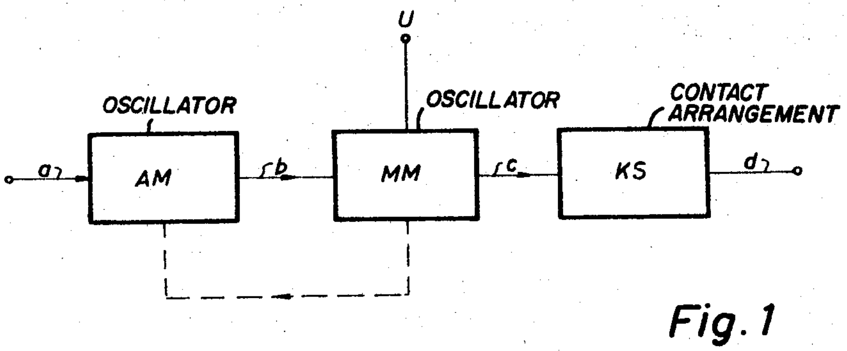
Figure 2:
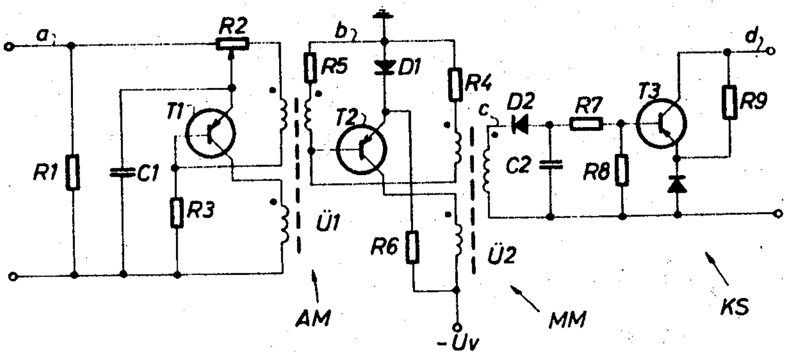
Figure 3:
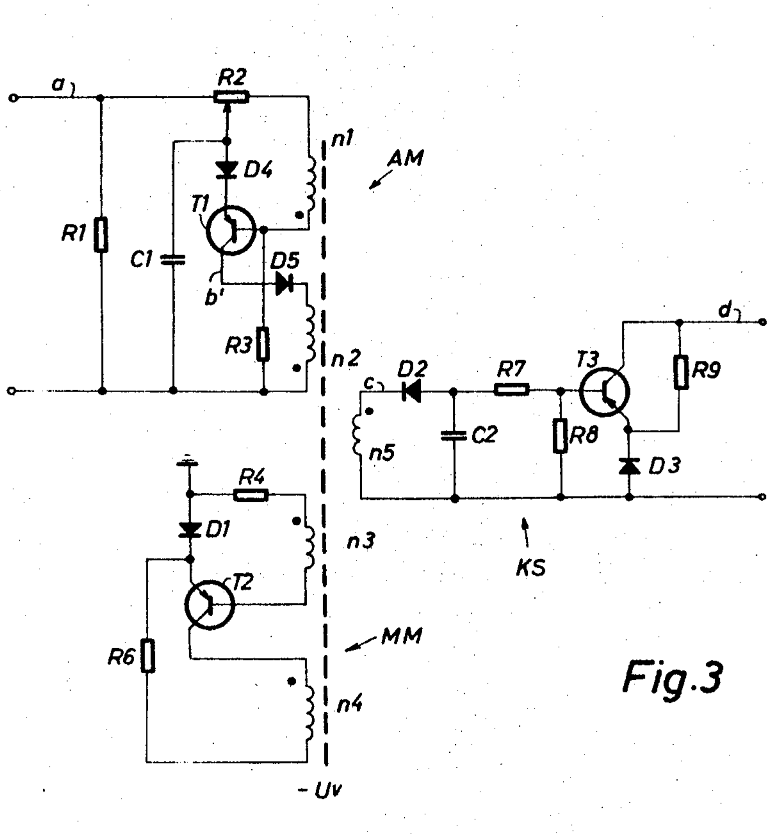
Figure 5:
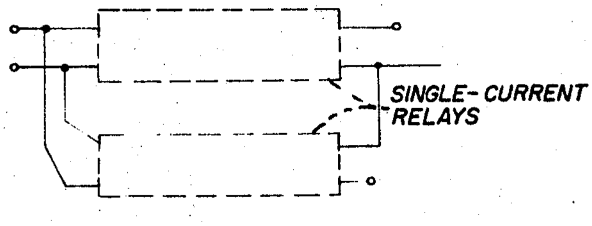
Figure 4:
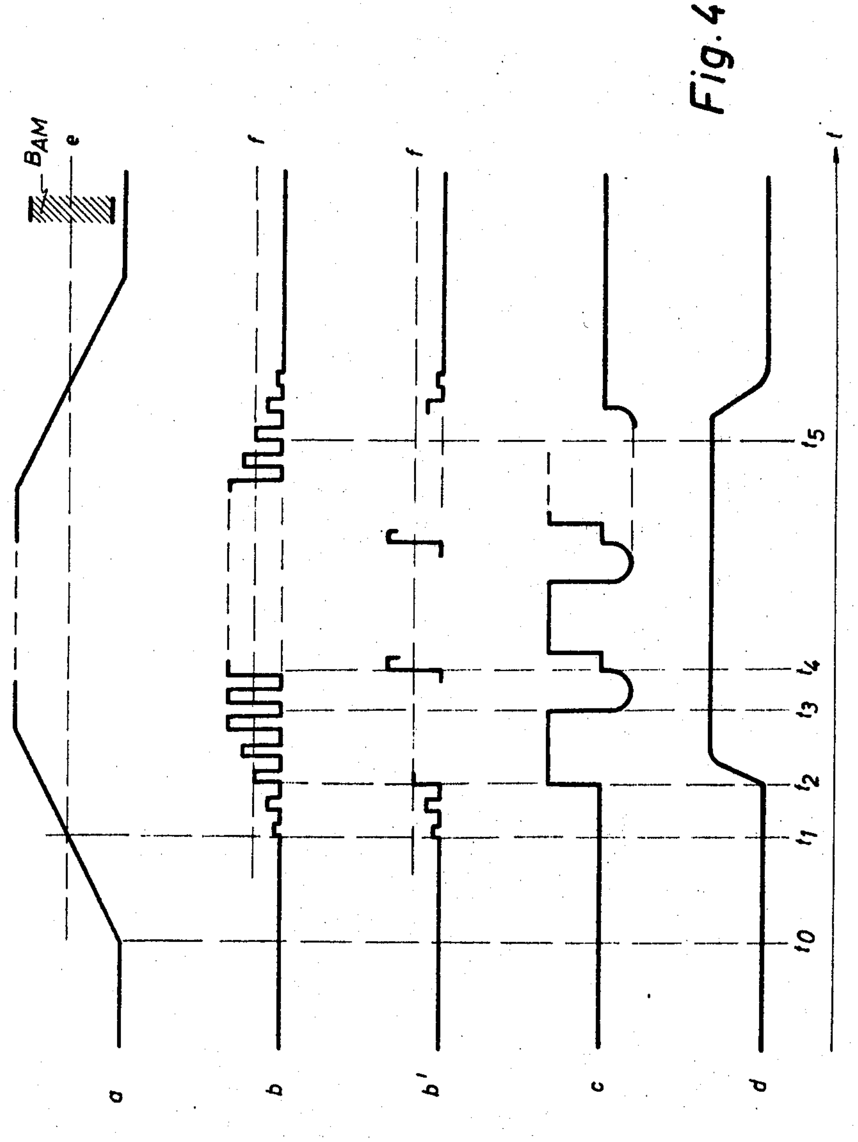

The invention will now be explained in detail by way of example with reference to FIGS. 1 to 5 of the accompanying drawings, in which:

FIG. 1 shows the block diagram of the two types of embodiments of the invention, FIG. 2 shows the circuit diagram of the first type of embodiment, FIG. 3 shows the circuit diagram of the second type of embodiment, FIG. 4 shows pulse diagrams relating to the first and the second type of embodiment, and FIG. 5 shows the connecting together of two single-current relays to form a double-current relay.

FIG. 1 shows the component groups of the two types of embodiments of the invention in a block diagram. A first oscillator AM is directly connected to a second oscillator MM, and the latter is connected to a contact arrangement KS. The first oscillator is not connected to the supply voltage U, but is operated by the energy of the input pulses. In the first type of embodiment of the invention there only exist the connecting lines indicated by the solid lines, whereas in the second type of embodiment, in addition to the solid-line connections, there are still effective, in addition to the solid-line connections, the connection indicated by the dash line extending from the oscillator MM to the astable oscillator AM. In FIGS. 2 and 3 the oscillators are designed as a blocking oscillator.

The telegraph pulses applied to the input of the arrangement, are converted into A.C. voltage pulses by the first oscillator AM acting as an inverter, and are transferred via a transformer shown in FIG. 2 to the second oscillator MM. It would be possible with the A.C. voltage pulses as tapped on the secondary side of the transformer to control directly a contact arrangement consisting of a rectifier, a filter section, and a transistor, so that the amplified input pulses could be taken off at the output of the arrangement. However, since the gain of the transistors employed in the output circuit is limited, the control energy at the input of the arrangement may not fall below a certain value (some milliwatts). On the other hand, this means to imply that the power derived from the input line is relatively high.

By inserting an amplifier between the first oscillator AM and the contact arrangement KS it is possible to improve the sensitivity of the arrangement at will, because now the energy for controlling the contact arrangement is no longer taken from the input line. When using, according to the present invention, a blocking oscillator at MM as the intermediate amplifier, it is possible to achieve a high amplification with the aid of one stage. Likewise, the switching behaviour of the entire arrangement is substantially improved thereby, i.e. there is achieved a quick opening and closing of the output line.

The frequency of the two oscillators is supposed to be high with respect to the telegraph frequency, in order to keep distortions as small as possible. In addition thereto, it is of advantage when choosing the frequency of the first oscillator to make it higher by the factor 2 to 5 than the frequency of the second oscillator. By suitably selecting the inset and decay points of the two oscillators it is possible to achieve a good distortion-correction of the telegraph signals.

FIG. 2 shows the circuit diagram of the first type of embodiment of the invention. The first oscillator AM (inverter) is designed as a conventional type of astable blocking oscillator circuit (components $U_1$, $T_1$, $R_3$). $C_1$ and $R_2$ serve to filter out the pulses produced by the blocking oscillator, and which react upon the input line. $R_1$ serves as an overload protection for the blocking oscillator; in this case there is appropriately used a voltage-dependent resistor. $R_2$ is used, in addition thereto, as an element for setting the inset point of the oscillation which is determined by the base-emitter voltage of transistor $T_1$, i.e. both for distortion-correction and for triggering.

The intermediate amplifier is designed as a conventional type of monostable blocking oscillator circuit (components $U_2$, $T_2$, $R_4$). The diode $D_1$ and the resistor $R_6$ constitute a response threshold which only causes the blocking oscillator to perform its full vibration after the pulses arriving via $U_1$, $R_5$ have reached a certain minimum value.

The contact arrangement KS is likewise known per se. The A.C. voltage arriving via $U_2$ is rectified by the diode $D_2$, and is filtered with the aid of $C_2$ and $R_7$. The transistor $T_3$ is controlled by the D.C. voltage as taken off at $C_2$.

The second type of embodiment of the invention, as may be taken from FIGS. 1 and 3, is almost the same as the first embodiment. It only differs from the first embodiment in that the coils of the first and of the second oscillators are accommodated on one common core. On account of this measure, the two oscillators, unlike those in the first example of embodiment, are not only dependent upon one another in the forward direction, but also in the backward direction, because they are magnetically coupled to one another. On account of this, the arrangement is simpler and more reliable.

FIG. 5 shows how two arrangements according to FIG. 2 or 3 of which each one independently acts as a single-current relay, may be combined to form a double-current relay, i.e. to combine elements so that the one arrangement evaluates one current direction of the input signal, while the other arrangement evaluates the opposite current direction for the purpose of controlling the output contact arrangements.

With reference to FIG. 4 there will now be described the mode of operation of the two arrangements. The trains of pulses indicated by *a*, *b*, *b'*, *c* and *d* are taken off at the points of FIGS. 2 and 3 designated by the same references. The input signal *a* is a single- or double-current pulse with strongly sloped edges. The range of response of the first oscillator is adjustable with the aid of resistor $R_2$, and is indicated by the designation $B_{AM}$. *e* is the operating or response threshold chosen for the example of embodiment. At the output of the first oscillator AM there will appear the signal *b*. In the shape of curve *b* there is plotted by *f* the response threshold of the second oscillator MM. This response threshold, for example, is adjusted in such a way that the second oscillator will only respond at a predetermined level of the pulses delivered by the first oscillator. It may also be adjusted in such a way, however, that the second oscillator will respond to the first oscillation of the first oscillator. At the output of the second oscillator there will appear the train of pulses *c*, and at the output of the contact arrangement there will appear the output pulse *d* whose leading and trailing edge is substantially steeper than that of the input signal *a*.

The input signal *a* commencing at $t_0$ will effect at the time position $t_1$, the starting of the first oscillator AM. Its oscillation amplitude slowly increases up to the time position $t_2$ at which there is reached the response threshold of the second oscillator MM. The latter is now started, and is triggered back at the time position $t_3$. The time from $t_3$ to $t_4$ is taken by the second oscillator to decay so that it, at the time position $t_4$, can be restarted by the first oscillator. The second oscillator is always restarted by the first oscillator, until finally, at the time position $t_5$, the amplitude of the signal produced by the first oscillator has decayed to such an extent as to be lying below the response threshold *f* of the second oscillator. On account of this the second oscillator is no longer started, and the train of pulses *c* will cease to exist at the time position $t_5$.

On the whole, the conditions are the same in the example of embodiment according to FIG. 3, with the exception that the place of the train of pulses *b* is taken by the train of pulses *b'*. Due to the reaction of the second oscillator upon the first oscillator, this first oscillator is blocked during the time of operation of the second oscillator, viz, from $t_2$ to $t_3$. Only after the second oscillator has been triggered back, the first oscillator is restarted. From the time position $t_2$ to the time position $t_3$, accordingly, positive voltage is applied to the winding *n*1 of the transformer core, with this voltage blocking the transistor $T_1$. From the time position $t_3$ to the time position $t_4$ a negative voltage is applied to the winding *n*1 which unblocks the transistor $T_1$. The winding *n*2 supplies a positive collector voltage. Due to the diode D5 no collector current is permitted to flow in the backward direction through transistor $T_1$.

In FIG. 3 the windings *n*1 and *n*2 are connected in such a way that the second oscillator is permitted to start to oscillate as soon as the transistor $T_1$, after having been dynamically unblocked, become reblocked. When exchanging the terminals of the windings *n*1 and *n*2, the second oscillator will start to oscillate upon unblocking of transistor $T_1$.

When dimensioning the circuit according to FIG. 3 the following will still have to be observed: If the first oscillator is started to oscillate with the input current $I_1$, then the second oscillator may not first be controlled with an input current $I_2$ ($I_1 < I_2$), because otherwise, until to the appearance of $L_2$, the contact arrangement would be controlled by signals whose energy is insufficient for effecting the complete unblocking. This problem, however, may be solved by providing a voltage threshold for $T_1$, e.g. by providing the diode D4, and by providing a suitable transmission ratio between *n*2 and *n*3.

With respect to the frequency of the input signals, the frequency of the second oscillator is chosen approximately one-hundred-times as high, and the frequency of the first oscillator, with respect to the frequency of the second oscillator, is chosen to be approximately five-times as high.

What is claimed is:

1. A circuit arrangement for the electronic simulation of a telegraph relay characterized by the combination of the following electronic groups of components:

a first oscillator controlled by input pulses and operated by the energy thereof, a second oscillator controlled by the first oscillator and galvanically separated therefrom, and a contact arrangement controlled by the second oscillator and galvanically separated therefrom.

2. An arrangement according to claim 1, in which the frequency of the two oscillators is substantially higher than the frequency of the input pulses.

3. An arrangement according to claim 1, in which the frequency of said first oscillator is 2 to 5 times higher than the frequency of the second oscillator.

4. An arrangement according to claim 1, in which filter means coupled to the oscillator are provided for keeping the oscillations of the oscillators away from the input line.

5. An arrangement according to claim 1, in which the oscillators respond to preselected threshold levels to offset distortion-correction of the input signals.

6. An arrangement according to claim 1, in which the windings of said oscillators are accommodated on a common core, so that the two oscillators not only affect each other in the forward direction, but also in the backward direction.

7. A circuit arrangement for the electronic simulation of a telegraph relay for double-current operation, in which two arrangements according to claim 1 are connected together in such a way that the one arrangement will evaluate the one current direction of the input signal, while the other arrangement will evaluate the opposite current direction for controlling output signals.

References Cited

UNITED STATES PATENTS

Re. 24,379 10/1957 Bissonette ........... 331—51
2,983,877 5/1961 Broermann ........... 331—52

JOHN KOMINSKI, *Primary Examiner.*

U.S. Cl. X.R.

307—275; 331—52, 54, 112, 185